United States Patent [19]

Marendaz

[11] Patent Number: 4,551,809

[45] Date of Patent: Nov. 5, 1985

[54] APPARATUS AND METHOD FOR MONITORING THE MACHINING CONDITIONS OF AN EDM APPARATUS

[75] Inventor: Georges-André Marendaz, Meyrin, Switzerland

[73] Assignee: Ateliers des Charmilles S.A., Geneva, Switzerland

[21] Appl. No.: 506,308

[22] Filed: Jun. 21, 1983

[30] Foreign Application Priority Data

Jun. 23, 1982 [CH] Switzerland .................. 3840/82

[51] Int. Cl.⁴ .................................. G06F 15/46
[52] U.S. Cl. ..................... 364/474; 364/482; 364/552; 219/69 W; 219/69 M; 219/69 D
[58] Field of Search ............. 219/69 W, 69 M, 69 D; 340/679, 680; 364/474, 482, 551, 550, 552

[56] References Cited

U.S. PATENT DOCUMENTS

| 4,256,944 | 3/1981 | Brandon | 219/10.55 D |
| 4,321,450 | 3/1982 | Inoue | 219/69 M |
| 4,335,436 | 6/1982 | Inoue | 364/474 |
| 4,392,195 | 7/1983 | Inoue | 364/167 |
| 4,414,456 | 11/1983 | Inoue | 219/69 D |

Primary Examiner—Jerry Smith
Assistant Examiner—Allen MacDonald
Attorney, Agent, or Firm—Hauke and Patalidis

[57] ABSTRACT

A process and apparatus for monitoring machining conditions in a travelling wire EDM apparatus. The resistivity of the machining fluid in the machining zone is measured and is compared to a reference value. A signal is provided as soon as the measured resistivity increases beyond the reference value and the signal is used for decreasing or interrupting the machining current.

8 Claims, 1 Drawing Figure

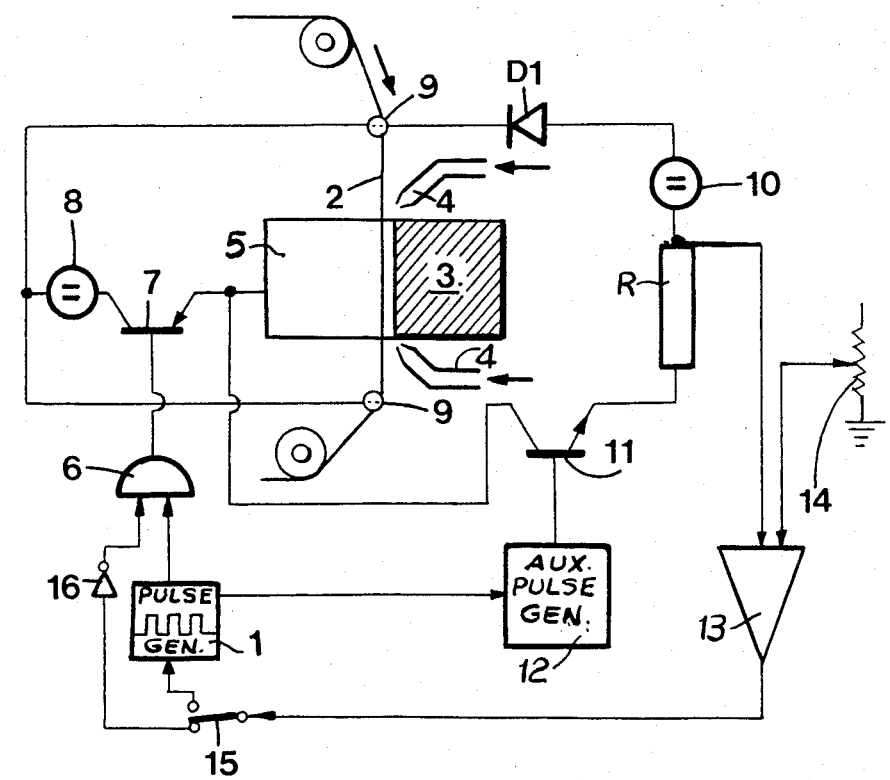

APPARATUS AND METHOD FOR MONITORING THE MACHINING CONDITIONS OF AN EDM APPARATUS

BACKGROUND OF THE INVENTION

The present invention relates to EDM apparatus and methods in general, and more particularly to an apparatus and method for monitoring the machining conditions during electrical discharge machining of an electrode workpiece by means of an electrode wire, in the course of which the electrical resistivity of the machining fluid across the electrodes is measured during the time intervals between consecutive machining discharges.

It is known, in diesinking EDM technology, to measure the resistivity of the machining fluid in the machining zone between two consecutive electrical discharges, for the purpose of detecting an excessive concentration of solid particles in the machining zone which is generally an indication of the formation of a bridge between the workpiece and the electrode tool preceding an imminent short circuit.

Measuring the resistivity of the machining fluid in the machining zone has also been used in travelling wire EDM technology, but for another purpose, mainly for measuring the thickness of the workpiece. The resistivity of the machining fluid is proportional to the thickness of the workpiece, which is an important parameter for achieving machining at optimum efficiency. Such a method of measuring the thickness of the workpiece is practical only under ideal machining conditions, in the course of which the specific resistivity of the machining fluid remains substantially constant.

It has been discovered that at the moment at which machining by an electrode wire deteriorates, the resistivity of the fluid increases between consecutive discharges, instead of decreasing as is the case during an EDM diesinking operation. This new and unexpected phenomenon, which is particular to travelling wire EDM machining, may be due to the sudden apparition of gas bubbles in the machining fluid, which results in entirely changing the conditions of heat exchange between the wire and the machining fluid, and which in turn causes rupture of the wire.

SUMMARY OF THE INVENTION

The new process of the present invention has for principal object to monitor the machining conditions in a travelling wire EDM apparatus by monitoring the resistivity of the machining fluid between two consecutive discharges, and more particularly the invention has for object to detect, through such monitoring, an increase of the resistivity of the machining fluid, and to provide a signal in response to such an increase of resistivity as an indication of deterioration of the machining conditions.

The apparatus and method of the present invention thus prevent the rupture of the electrode wire by detecting the deterioration of thermal conditions under which the electrode wire operates, independently of the corresponding decrease of machining efficiency. Therefore, the method and apparatus of the invention supply to the electrode wire an electrical current providing maximum machining efficiency.

These and other objects of the present invention will become apparent to those skilled in the art when the following description of the best mode contemplated for practicing the invention is read in conjunction with the single FIGURE of the drawing, that schematically illustrates an example of travelling wire EDM apparatus for practicing the method of the invention.

BRIEF DESCRIPTION OF THE DRAWING

The single FIGURE of the drawing schematically illustrates an arrangement for monitoring the machining conditions in a travelling wire EDM apparatus, according to the present invention.

DETAILED DESCRIPTION OF THE PREFERRED EMBODIMENT

The drawing illustrates an arrangement for monitoring the machining conditions in a travelling wire EDM apparatus shown only as far as the elements illustrated are necessary for a clear understanding of the invention. The illustrated EDM apparatus comprises a pulse generator 1 supplying electrical pulses to a machining zone between a travelling wire electrode 2 and a workpiece 3. Machining fluid nozzles 4 are disposed such as to supply fluid to the machining zone between the electrode wire 2 and the workpiece 3. Means, not shown but well known in the art, are provided for feeding the electrode wire 2 longitudinally to the machining zone and for laterally displacing the electrode wire 2 and the workpiece 3 relative to each other such as to effectuate in the workpiece a cut 5 of appropriate path.

The electrical pulses supplied by the generator 1 control, through an AND gate 6, an electronic switch 7, represented by a transistor having its base connected to the output of the AND gate 6, so long as the AND gate 6 is abled, i.e. with no signal applied to its second input. When the electronic switch 7 is closed, a voltage source 8 is connected across the wire 2 and the workpiece 3, one of the terminals of the power supply 8 being connected to the wire 2 by way of a pair of sliding contacts 9.

The electrical circuit further comprises an auxiliary voltage source 10 which has a terminal connected to one of the sliding contacts 9 through a blocking diode D1, and its other terminal connected to the workpiece 3 through a resistor R and an electronic switch 11, also represented by a transistor. The circuit of the auxiliary voltage source 10 permits to measure the resistivity of the machining fluid in the machining zone. The electronic switch 11 is controlled by an auxiliary pulse generator 12, synchronously driven by the pulse generator 1, such as to control the electronic switch 11 to conductance during at least a portion of the time intervals between consecutive machining pulses, provided by the circuit of the voltage source 8, as controlled by the pulse generator 1.

When the auxiliary pulse generator 12 controls the electronic switch 11 to conductance, the circuit of the auxiliary DC voltage supply 10 is closed through the diode D1, the wire 2, the workpiece 3, the switch 11 and the resistor R. The current through the circuit is inversely proportional to the total resistance of the circuit, that includes the resistance between the wire 2 and the workpiece 3 which is a function of the resistivity of the machining fluid in the machining zone in the off time intervals, in the course of which no machining discharges occur through the machining zone. The current flowing through the circuit causes a voltage drop across the resistor R which is applied to an input of a comparator circuit 13, having another input to which is applied a reference voltage obtained from a potentiometer 14.

When the voltage across the resistor R becomes lower than the reference voltage, this is an indication that the resistance of the machining fluid in the machining zone is beyond a predetermined value, and, therefore, that the resistivity of the machining fluid is also beyond a predetermined value. It can be seen that, for a given resistivity of the machining fluid, the resistance measured between the electrode wire 2 and the workpiece 3 decreases as a function of the thickness of the workpiece. The potentiometer 14, providing the reference voltage to an input of the comparator circuit 13, is therefore adjusted taking into consideration the thickness of the workpiece 3. As soon as the resistivity of the machining fluid increases beyond a predetermined value, the comparator circuit 13 supplies an output signal for the purpose of modifying the machining current. A bi-polar switch 15, having its movable contact in the position shown in the drawing, applies the output signal from the comparator circuit 13 to a second input of the AND gate 6 through an inverter 16 to inhibit the gate and therefore continuously bias the electronic switch 7 to non-conductance such as to cut off machining current until the machining conditions have returned to normal. However, during cut off of the machining current both pulse generators 1 and 12 continue to operate, such that the periodic measurements of the resistivity of the machining fluid are continued. In the other position of the movable contact of the switch 15, the signal at the output of the comparator circuit 13 is applied to an input of the pulse generator 1 to modify one of the machining parameters, for example to decrease the average machining current by decreasing the amplitude of the electrical pulses, or decreasing the duration of the pulses, or yet by increasing the off time intervals between consecutive pulses.

Alternative means may be provided for practicing the invention. For example, the measure of the resistivity of the machining fluid between the workpiece 3 and the electrode wire 2 may be effected continuously and provide a circuit to suppress at the input of the comparator circuit 13 the signal being measured during each machining pulse.

Having thus described the invention by way of a combination of elements well designed for practicing the invention, modification whereof will be apparent to those skilled in the art, what is claimed as new is as follows:

1. A method for monitoring machining conditions in the course of electrical discharge machining of an electrode workpiece by means of a travelling wire electrode wherein a machining fluid is applied to a machining zone between the electrode workpiece and the wire electrode, said method comprising measuring the resistivity of the machining fluid during time intervals between consecutive electrical discharges, detecting through said resistivity measurements an increase of resistivity of said machining fluid, and providing a signal in response to said increase of resistivity as an indication of machining condition deterioration.

2. The method of claim 1 wherein said signal is provided upon said resistivity reaching a predetermined value.

3. The method of claim 2 further comprising cutting off said electrical discharges when said resistivity increases beyond said predetermined value.

4. The method of claim 2 further comprising decreasing machining current when said resistivity increases beyond said predetermined value.

5. The method of claim 1 comprising providing a first signal proportional to the measured resistivity, comparing said first signal with a reference value signal, and supplying said signal indicating machining condition deterioration when said first signal reaches said reference value signal.

6. An apparatus for monitoring machining conditions in the course of a machining operation being effected on a workpiece by means of a travelling wire electrode, machining fluid being supplied to a machining zone between said electrode workpiece and said travelling wire electrode, said apparatus comprising means for measuring the resistivity of said machining fluid in said machining zone during time intervals between consecutive electrical discharges, and means for comparing said measured resistivity to a reference value and for providing a signal when said measured resistivity increases beyond said reference value.

7. The apparatus of claim 6 further comprising means for cutting off said electrical discharges when said resistivity increases beyond said predetermined value.

8. The apparatus of claim 6 further comprising means for decreasing machining current when said resistivity increases beyond said reference value.

* * * * *